United States Patent
Straub et al.

(10) Patent No.: US 6,268,672 B1
(45) Date of Patent: Jul. 31, 2001

(54) SYSTEM AND METHOD FOR PROTECTING A SUBMERGIBLE MOTOR FROM CORROSIVE AGENTS IN A SUBTERRANEAN ENVIRONMENT

(75) Inventors: Peter H. G. Straub, Leduc; Cameron G. Haworth, Calgary, both of (CA)

(73) Assignee: Camco International, Inc., Houston, TX (US)

( * ) Notice: Subject to any disclaimer, the term of this patent is extended or adjusted under 35 U.S.C. 154(b) by 0 days.

(21) Appl. No.: 09/182,578

(22) Filed: Oct. 29, 1998

(51) Int. Cl.[7] .............................. H02K 5/10; H02K 5/12; E21B 43/01
(52) U.S. Cl. ............................................. 310/87; 166/105
(58) Field of Search ........................ 166/105; 417/424.2, 417/424.1, 423.3, 422, 414; 310/87

(56) References Cited

U.S. PATENT DOCUMENTS

| | | |
|---|---|---|
| 918,596 | 4/1909 | Reist . |
| 1,610,726 | 12/1926 | Arutunoff . |
| 1,701,468 | 2/1929 | Arutunoff . |
| 2,001,649 | 5/1935 | Arutunoff . |
| 2,569,741 * | 10/1951 | Arutunoff ............................ 310/87 |
| 2,674,194 | 4/1954 | Arutunoff ............................ 103/87 |
| 2,682,229 | 6/1954 | Luenberger ......................... 103/87 |
| 3,426,691 | 2/1969 | Anderson ............................ 103/87 |
| 3,475,634 * | 10/1969 | Bogdanov et al. .................. 310/87 |
| 3,770,635 * | 11/1973 | Atendido et al. ................... 508/469 |
| 3,785,753 | 1/1974 | Bognanov et al. ................. 417/424 |
| 3,947,709 | 3/1976 | Waltman ............................. 310/87 |
| 4,010,392 | 3/1977 | Bogdanov et al. ................. 310/87 |
| 4,436,488 * | 3/1984 | Witten ................................. 417/53 |
| 4,462,765 | 7/1984 | Rodkin et al. ..................... 417/414 |
| 4,583,923 * | 4/1986 | James ................................. 417/414 |
| 4,940,911 * | 7/1990 | Wilson ................................ 310/87 |
| 5,367,214 | 11/1994 | Turner, Jr. .......................... 310/87 |
| 5,554,897 | 9/1996 | Martin et al. ...................... 310/54 |
| 5,622,222 | 4/1997 | Wilson et al. ................. 166/105.4 |
| 5,796,197 | 8/1998 | Bookout ............................. 310/85 |

\* cited by examiner

Primary Examiner—David Bagnell
Assistant Examiner—Meredith C. Petravick
(74) Attorney, Agent, or Firm—Fletcher, Yoder & Van Someren

(57) ABSTRACT

A motor protector for use in protecting an electric motor in a subterranean environment. The motor protector utilizes a dual, flexible bladder system. One of the expandable bladders provides for the expansion and contraction of motor oil. The other expandable bladder contains a supply of neutralizing solution. The bladder filled with neutralizing solution cooperates with the bladder filled with motor oil to maintain the expandable bladder bathed in neutralizing solution. This prevents migration of corrosive agents into the motor oil.

20 Claims, 2 Drawing Sheets

SYSTEM AND METHOD FOR PROTECTING A SUBMERGIBLE MOTOR FROM CORROSIVE AGENTS IN A SUBTERRANEAN ENVIRONMENT

FIELD OF THE INVENTION

The present invention relates generally to motor protectors for protecting submergible motors, such as those used in raising fluids from petroleum wells, and particularly to a system and method that utilizes a neutralizing agent to neutralize corrosive agents before they can damage the internal components of a submergible motor.

BACKGROUND OF THE INVENTION

A variety of production fluids are pumped from subterranean environments. Different types of submergible pumping systems may be disposed in production fluid deposits at subterranean locations to pump the desired fluids to the surface of the earth.

For example, in producing petroleum and other useful fluids from production wells, it is generally known to provide a submergible pumping system for raising the fluids collected in a well. Production fluids, e.g. petroleum, enter a wellbore drilled adjacent a production formation. Fluids contained in the formation collect in the wellbore and are raised by the submergible pumping system to a collection point at or above the surface of the earth.

A typical submergible pumping system includes several components, such as a submergible electric motor that supplies energy to a submergible pump. The system further may include a variety of additional components, including a connector used to connect the submergible pumping system to a deployment system. Conventional deployment systems include production tubing, cable and coiled tubing. Additionally, power is supplied to the submergible electric motor via a power cable that runs along the deployment system.

Often, the subterranean environment, and specifically the well fluid, contains corrosive compounds that may include $CO_2$, $H_2S$ and brine water. These corrosive agents can be detrimental to components of the submergible pumping system, particularly to internal electric motor components, such as copper windings and bronze bearings.

Submergible electric motors are difficult to protect from corrosive agents because of their design requirements that allow use in the subterranean environment. A typical submergible motor is internally filled with a fluid, such as a dielectric oil, that facilitates cooling and lubrication of the motor during operation. As the motor operates, however, heat is generated, which, in turn, heats the internal motor oil causing expansion of the oil. Conversely, the motor cools and the motor oil contracts when the submergible pumping system is not being used.

Accordingly, this type of submergible motor requires a motor oil expansion system able to accommodate the expanding and contracting motor oil. Also, the internal pressure of the motor must be allowed to equalize or at least substantially equalize with the surrounding pressure found within the wellbore. As a result, it becomes difficult to prevent the ingress of corrosive agents into the motor oil and internal motor components.

Numerous types of motor protectors have been designed and used in isolating submergible motors while permitting expansion and contraction of the internal motor oil. A variety of elastomeric bladders alone or in combination with labyrinth sections have been used as a barrier between the well fluid and the motor fluid. For example, expandable elastomeric bags or bladders have been used in series to prevent mixing of wellbore fluid with motor oil while permitting expansion and contraction of the motor oil.

In this latter design, the motor protector includes a pair of chambers that each have an elastomeric bladder. The first bladder is disposed in a first chamber of the pair of chambers and includes an interior in fluid communication with the motor. This fluid communication permits motor oil to flow from the motor into the elastomeric bladder during expansion and to flow from the elastomeric bladder back to the motor during contraction.

The second chamber also includes an expandable bladder, filled with motor oil, that is in fluid communication with the first chamber but external to the first elastomeric bladder. The second chamber also is vented or open to the wellbore environment. This permits fluid to flow between the second elastomeric bladder and the adjacent chamber as the first elastomeric bladder expands or contracts. Simultaneously, wellbore fluid is allowed to flow in and out of the second chamber, external to the second elastomeric bladder, to permit equalization of pressure as the second bladder expands and contracts.

This type of expansion chamber works well in many environments, but certain of the corrosive agents found in at least some wellbore environments include corrosive gases that permeate the elastomeric bags or bladders. These corrosive agents eventually can work their way into the motor oil within the first elastomeric bladder and ultimately corrode and damage internal components of the electric motor.

It would be advantageous to utilize an expandable bladder system in a motor protector without the threat of corrosive agents migrating to the internal components of the electric motor.

SUMMARY OF THE INVENTION

The present invention features a device for protecting a submergible motor from corrosive agents found in a wellbore environment. The device also accommodates the expansion and contraction of the motor oil disposed within an interior of the submergible motor. The device comprises a housing having a first chamber and a second chamber. A first bladder is disposed in the first chamber and includes an interior region in fluid communication with the interior of the submergible motor. A second bladder is disposed in the second chamber and includes an interior region in fluid communication with the first chamber external to the first bladder. The second chamber is exposed to the pressure of the wellbore environment to permit equalization of pressures. Furthermore, a neutralizer is disposed for movement between the interior region of the second bladder and the first chamber external to the first bladder.

According to another aspect of the present invention, a system is provided for incorporation into a motor protector of the type used in protecting a submergible motor from corrosive agents found in a subterranean environment. The submergible motor has an interior filled with a motor oil that aids in cooling and lubrication of the motor. The system includes a bladder having an interior region. The bladder includes a port that permits fluid flow to and from the interior region. The port is connectable to the submergible motor such that motor oil may flow between the interior region of the bladder and the interior of the submergible motor. Also, a liquid neutralant barrier is disposed between the bladder and the subterranean environment to prevent contamination of the motor oil.

According to a further aspect of the present invention, a method is provided for protecting a submergible motor in a submergible pumping system from corrosive agents. The method also provides for the expansion and contraction of a motor oil disposed in the submergible motor. The preferred method comprises connecting a submergible motor with an expandable bladder to permit flow of motor oil between the submergible motor and the expandable bladder. The method further includes holding a supply of liquid neutralant in a neutralant bladder disposed intermediate the motor oil and potential corrosive agents. Further, the method includes neutralizing the corrosive agents before they are able to contaminate the motor oil.

BRIEF DESCRIPTION OF THE DRAWINGS

The invention will hereafter be described with reference to the accompanying drawings, wherein like reference numerals denote like elements, and.

DETAILED DESCRIPTION OF THE PREFERRED EMBODIMENTS

Figure 1:
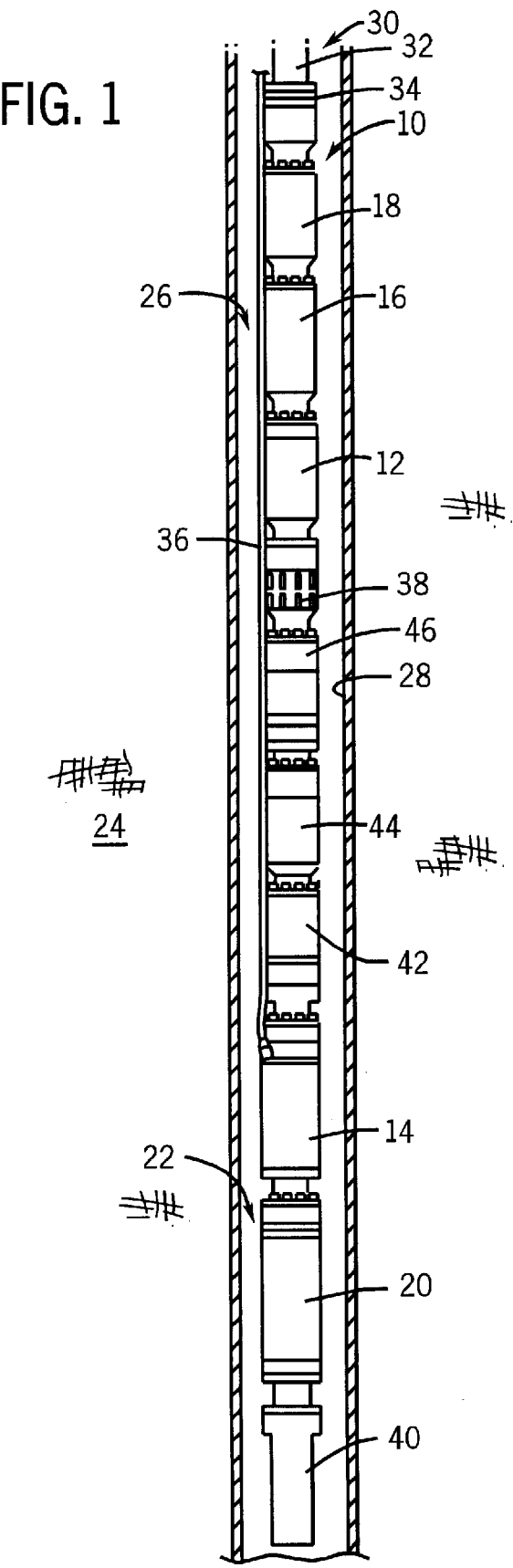
FIG. 1 is a front elevational view of a submergible pumping system positioned in a wellbore and including a motor protector, according to a preferred embodiment of the present invention.

Referring generally to FIG. 1, a submergible pumping system 10, of the type utilized in pumping subterranean production fluids to the surface of the earth, is illustrated. Submergible pumping system 10 may comprise a wide variety of components depending on the particular application or subterranean environment in which it is used. However, system 10 typically includes at least a submergible pump 12 and a submergible electric motor 14.

In the particular embodiment illustrated, additional submergible pumps 16 and 18 are connected in series with submergible pump 12. Each submergible pump 12, 16 and 18 may comprise, for example, a centrifugal pump, a progressing cavity pump, or a gear pump. Similarly, in the exemplary embodiment illustrated, an additional submergible electric motor 20 is connected in series with motor 14. At least one submergible electric motor and one submergible pump are used to pump production fluids to the earth's surface, but additional motors and pumps may be utilized, depending on the environment, type of production and depth of the well.

System 10 is designed for deployment in a well 22 within a geological formation 24 containing the desirable production fluids, such as petroleum. In a typical application, a wellbore 26 is drilled and lined with a wellbore casing 28. The submergible pumping system 10 is deployed within wellbore 26 to a desired location for pumping of wellbore fluids.

As illustrated, submergible pumping system 10 typically includes other components. For example, system 10 is deployed in well 22 by a deployment system 30 that may comprise cable, coiled tubing, or production tubing 32, as illustrated. Production tubing 32 provides a fluid path through which the production fluids are pumped to the surface. Deployment system 30 is connected to the string of pumping system components by a connector or head 34.

Also, a power cable 36 generally is disposed along or through deployment system 30. Power cable 36 is connected to the electric motor or motors, i.e. submergible electric motors 14 and 20, to power the entire pumping system 10.

Other components may include a gas separator 38, a pressure and temperature sensing instrument 40 and one or more motor protectors 42, 44 and 46. Gas separator 38 separates out components of the production fluid that are in gaseous form prior to their entering submergible pump 12. Pressure and temperature sensing instrument 40 is designed to detect a variety of parameters in the downhole, subterranean environment. Motor protectors 42, 44 and 46, on the other hand, are designed to protect submergible electric motors 14 and 20 from corrosive agents found in the production fluid and wellbore environment while permitting equalization of internal and external pressures. Motor protectors may also be designed to absorb the downthrust from the submergible pump or pumps, as is well known to those of ordinary skill in the art.

Motor protectors 42, 44 and 46 may be a mixture of different types of motor protectors that each include, for instance, labyrinth sections, bag sections or combinations of these different types of sections that help isolate electric motors 14 and 20. One or more of the illustrated motor protectors may incorporate the system of the present invention. For example, motor protector 42, motor protector 44 or both can be modified according to the description provided below.

An exemplary motor protector that can be modified according to the present invention, is a modular protector incorporating an expandable bag or bladder, such as the Reda BSB type protector available from the Reda Pump Company of Bartlesville, Okla. This type of protector has a dual bag or dual bladder system readily utilized with the current invention.

Figure 2:
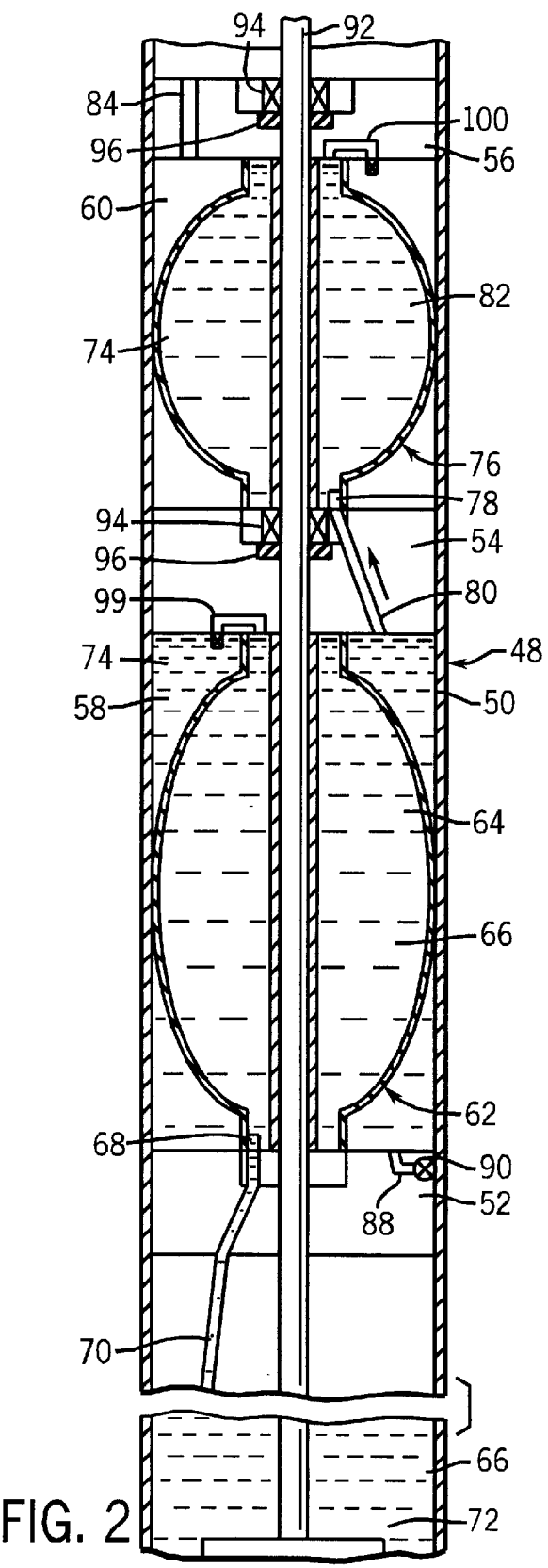
FIG. 2 is a cross-sectional view of a system, according to a preferred embodiment of the present invention, in which the motor oil is in an expanded state.
Figure 3:
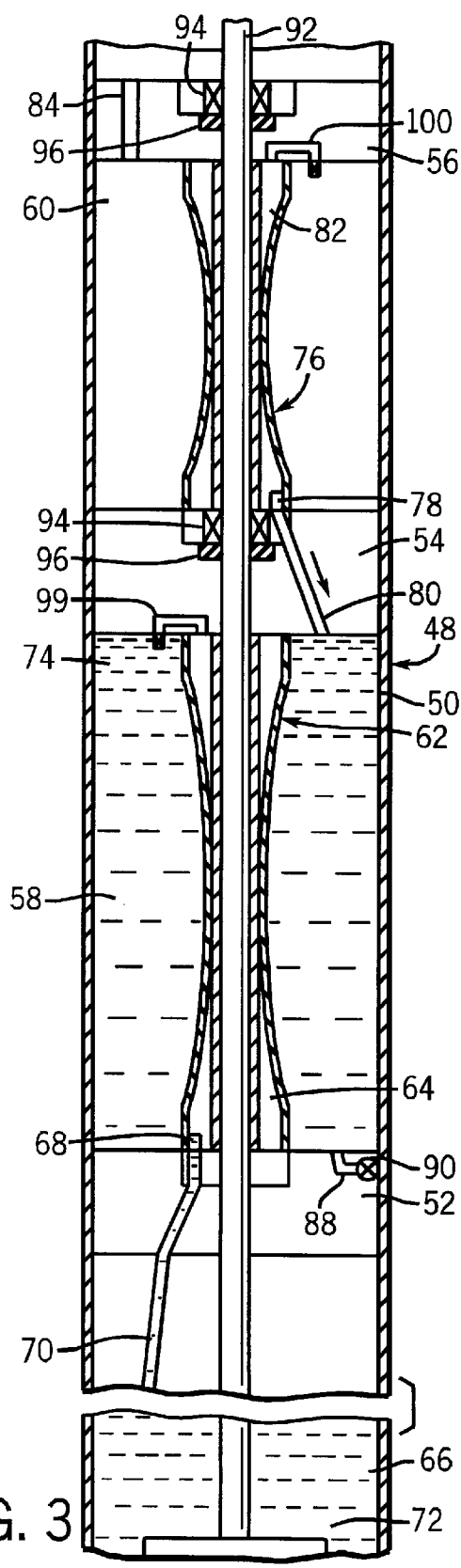
FIG. 3 is a cross-sectional view similar to that illustrated in FIG. 2, but showing the motor oil in a contracted state.

Referring now to FIGS. 2 and 3, a preferred embodiment of the present invention can be explained. An outer motor protector housing 48 includes an outer wall 50 that preferably is tubular in shape. A plurality of dividers or bulkheads 52, 54 and 56 are disposed within outer wall 50 generally transverse to outer wall 50. This arrangement creates a first chamber 58 and a second chamber 60 within outer motor protector housing 48.

An expandable bladder 62 is disposed in first chamber 58. First expandable bladder 62 preferably comprises an elastomeric bag or elastomeric material that permits an interior region 64 to be filled with a motor oil 66 as the motor oil in motors 14 and/or 20 expands during operation. The elastomeric materials may comprise AFLAS, HSN or neoprene, but other materials, such as metallic materials, e.g. flexible monel, potentially can be used to form bladder 62.

First expandable bladder 62 also includes a fluid flow-through port 68 that is connected to a fluid passageway 70 which extends through bulkhead 52 and ultimately to an interior region 72 of submergible electric motor 14. Thus, as the internal motor oil 66 is heated by the electric motor, it expands and flows through fluid passageway 70 and flow-through port 68 into interior 64 of first expandable bladder 62. This causes expansion of bladder 62, as illustrated in FIG. 2. When the motor oil 66 begins to cool, e.g. during motor shutdown, the motor oil contracts and flows from interior 64 through flow-through port 68 and fluid passageway 70 back to interior region 72 of the electric motor. This causes a contraction of first expandable bladder 62, as illustrated in FIG. 3. Also, first expandable bladder 62 includes a pressure relief valve 99 that vents motor oil to first chamber 58 if the oil pressure rises to an undesirable level, e.g. a level that could damage bladder 62.

To accommodate the expansion and contraction of first expandable bladder 62 a neutralant or neutralizer 74 is disposed in first chamber 58 external to first expandable bladder 62. Neutralizer 74 preferably is in liquid form and in fluid communication with a neutralizer bladder or second expandable bladder 76 disposed in second chamber 60. Preferably, second expandable bladder is similar to first expandable bladder 62 in design and in the materials utilized in its formation.

Second expandable bladder 76 also has a flow-through port 78 connected to a fluid passageway 80. Flow-through port 78 and fluid passageway 80 allow neutralizer 74 to flow back and forth between first chamber 58, external to first expandable bladder 62, and an interior 82 of second expandable bladder 76. Thus, when first expandable bladder 62 fills with motor oil 66 and expands, the liquid neutralizer 74 is forced through bulkhead 54, via fluid passageway 80 and flow-through port 78, into interior 82 of second expandable bladder 76. This causes second expandable bladder 76 to expand in second chamber 60, as illustrated in FIG. 2. A pressure relief valve 100 protects bladder 76 from overexpansion and is configured to exhaust neutralizer into second chamber 60 in the event the fluid pressure rises to an undesirable level. Conversely, when the motor oil 66 contracts, first expandable bladder 62 also contracts and pulls the neutralizer 74 from interior 82 of second expandable bladder 76 into first chamber 58, as illustrated best in FIG. 3.

Second expandable bladder 76 may freely expand and contract within second chamber 60, because second chamber 60 is vented to the well. A vent or opening 84 provides a fluid flow path between wellbore 26 and second chamber 60, external to second expandable bladder 76. Thus, wellbore fluids may flow in and out of second chamber 60 to permit expansion and contraction of second expandable bladder 76. Vent 84 also permits equalization of the internal pressures of pumping system components, e.g. submergible electric motors 14 and 20, with the external pressure in the well.

The use of a liquid neutralizer 74 in the second expandable bladder 76 provides a strong barrier to corrosive agents that, otherwise, might permeate second expandable bladder 76 and first expandable bladder 62. Once the corrosive agents, e.g. corrosive gasses, permeate the bladders, they ultimately migrate through motor oil 66 and damage internal components of the electric submergible motors. In the preferred system, the only point of exposure to wellbore fluids is through vent 84. However, once potential corrosive agents enter second chamber 60, they are blocked or neutralized by the neutralizer 74 disposed throughout interior 82, fluid passageway 80 and the portion of first chamber 58 external to first expandable bladder 62.

An exemplary preferred neutralizer 74 is a liquid neutralizer comprising a solution of amines and methanol. For example, a liquid neutralizer, referred to as ATC 707-A (hydrogen sulfide scavenger) may be purchased from Alberta Treating Chemicals, Ltd. of Calgary, Alberta, Canada. The concentration of methanol and amines may need to be adjusted depending on the environment in which submergible pumping system 10 is utilized. For example, it may be desirable to lower the concentration of methanol to approximately 10% to 30% (a specific example is approximately 20% methanol base) and/or it may be desirable to raise the concentration of amines to approximately 80% concentration. The liquid neutralizer 74 is injected into first chamber 58 and ultimately into second expandable bladder 76 via a fluid passageway 88 and a ball check valve 90 that provide a fluid fill path from the outside of outer housing 48.

As known to those of ordinary skill in the art and as apparent from the exemplary Reda BSB type modular protector, first expandable bladder 62 and second expandable bladder 76 may be mounted to the appropriate bulkheads 52, 54 and 56. Additionally, a rotatable shaft 92 typically is disposed along the longitudinal axis of outer motor protector housing 48, and through bulkheads 52, 54 and 56 as well as bladders 62 and 76. The shaft section 92 may be rotatably mounted in bulkheads 52, 54 and 56 via appropriate bearings 94 and mechanical seals 96.

It will be understood that the foregoing description is of a preferred exemplary embodiment of this invention, and that the invention is not limited to the specific form shown. For example, a variety of neutralants may be used depending on the environment; the bladders may be made from a variety of materials and in a variety of configurations; the arrangement of submergible pumping system components can vary substantially; and the arrangement of flexible bladders can be changed. For example, the first expandable bladder 62 potentially can be disposed inside of second expandable bladder 76. This configuration would still provide a barrier to corrosive agents via the neutralizer disposed within the outer expandable bladder but external to the internal bladder containing motor oil. These and other modifications may be made in the design and arrangement of the elements without departing from the scope of the invention as expressed in the appended claims.

What is claimed is:

1. A device for protecting a submergible motor from corrosive agents found in a wellbore environment while accommodating expansion and contraction of a motor oil disposed in an interior of the submergible motor, comprising:

a housing having a first chamber and a second chamber;

a first bladder disposed in the first chamber, the first bladder having an interior region in fluid communication with the interior of the submergible motor;

a second bladder disposed in the second chamber, the second bladder having an interior region in fluid communication with the first chamber external to the first bladder, the second chamber being exposed to the pressure of the wellbore environment; and a neutralizer disposed for movement between the interior region of the second bladder and the first chamber external to the first bladder.

2. The device as recited in claim 1, wherein the first bladder comprises an elastomeric material.

3. The device as recited in claim 1, wherein the second bladder comprises an elastomeric material.

4. The device as recited in claim 2, wherein the second bladder comprises an elastomeric material.

5. The device as recited in claim 1, wherein the neutralizer includes a solution comprising an amine.

6. The device as recited in claim 5, wherein the solution comprises a methanol base.

7. The device as recited in claim 6, wherein the methanol base comprises approximately ten percent to thirty percent of the solution.

8. The device as recited in claim 6, wherein the methanol comprises approximately 20% of the solution.

9. A system that can be incorporated into a motor protector used in protecting a submergible motor from corrosive agents in a subterranean environment, the submergible motor having an interior containing a motor oil, comprising:

a bladder having an interior region, the bladder including a port that permits fluid flow to and from the interior region, wherein the port is connectable to the submergible motor such that the motor oil may flow between the interior region and the interior of the submergible motor; and a liquid neutralizing barrier disposed between the bladder and the subterranean environment to prevent contamination of the motor oil.

10. The system as recited in claim 9, wherein the liquid neutralizing barrier comprises an amine solution.

11. The system as recited in claim 9, further comprising a second bladder having an interior for holding the liquid neutralizing barrier.

12. The system as recited in claim 11, wherein the interior of the second bladder is in fluid communication with an exterior of the bladder.

13. A system that can be incorporated into a motor protector used in protecting a submergible motor from corrosive agents in a subterranean environment, the submergible motor having an interior containing a motor oil, comprising:

a bladder having a interior region, the bladder including a port that permits fluid flow to and from the interior region, wherein the port is connectable to the submergible motor such that the motor oil may flow between the interior region and the interior of the submergible motor;

a liquid neutralizing barrier disposed between the bladder and the subterranean environment to prevent contamination of the motor oil; and a second bladder having an interior for holding the liquid neutralizing barrier, wherein the interior of the second bladder is in fluid communication with an exterior of the bladder, and wherein the bladder and the second bladder are disposed in a bladder chamber and a second bladder chamber, respectively, further wherein the interior of the second bladder is connected to the bladder chamber, externally of the bladder, by a neutralizing fluid flow path.

14. The system as recited in claim 13, wherein the second bladder chamber is vented to the subterranean environment externally of the second bladder.

15. A method for protecting a submergible motor in a submergible pumping system from corrosive agents while permitting expansion and contraction of a motor oil disposed in the submergible motor, comprising:

connecting a submergible motor with an expandable bladder to permit flow of a motor oil between the submergible motor and the expandable bladder;

holding a neutralizing fluid between the motor oil and potential corrosive agents; and neutralizing the corrosive agents before they are able to contaminate the motor oil.

16. The method as recited in claim 15, further comprising at least partially bathing the expandable bladder in neutralizing fluid.

17. The method as recited in claim 16, further comprising:

enclosing the expandable bladder in a chamber; and connecting the chamber with a supply of the neutralizing fluid.

18. The method as recited in claim 17, further comprising providing a second expandable bladder to hold the neutralizing fluid.

19. The method as recited in claim 18, further comprising preparing the neutralizing fluid with a solution of amines and methanol.

20. The method as recited in claim 18, further comprising forming the expandable bladder with an elastomeric bag.

* * * * *